(12) United States Patent
Abramov et al.

(10) Patent No.: US 8,978,417 B2
(45) Date of Patent: Mar. 17, 2015

(54) METHOD FOR LOW ENERGY SEPARATION OF A GLASS RIBBON

(71) Applicant: Corning Incorporated, Corning, NY (US)

(72) Inventors: Anatoli A. Abramov, Painted Post, NY (US); Jae H. Yu, Lexington, KY (US); Naiyue Zhou, Painted Post, NY (US)

(73) Assignee: Corning, Incorporated, Corning, NY (US)

( * ) Notice: Subject to any disclaimer, the term of this patent is extended or adjusted under 35 U.S.C. 154(b) by 0 days.

(21) Appl. No.: 14/200,675

(22) Filed: Mar. 7, 2014

(65) Prior Publication Data

US 2014/0182338 A1    Jul. 3, 2014

Related U.S. Application Data

(63) Continuation of application No. 13/305,158, filed on Nov. 28, 2011, now Pat. No. 8,677,783.

(51) Int. Cl.
| | | |
|---|---|---|
| *C03B 9/42* | (2006.01) | |
| *C03B 21/02* | (2006.01) | |
| *C03B 33/08* | (2006.01) | |
| *C03B 17/06* | (2006.01) | |
| *C03B 33/02* | (2006.01) | |
| *C03B 33/09* | (2006.01) | |
| *C03B 21/00* | (2006.01) | |

(52) U.S. Cl.
CPC ............... *C03B 33/082* (2013.01); *C03B 17/06* (2013.01); *C03B 33/0215* (2013.01); *C03B 33/091* (2013.01); *C03B 21/00* (2013.01); *B65G 2249/04* (2013.01)

USPC ............................................................ 65/97

(58) Field of Classification Search
CPC .............. C03B 33/091; C03B 33/0222; C03B 33/0215; C03B 21/02; C03B 33/02; C03B 33/0207; C03B 33/037; C03B 33/09
USPC .................................. 219/121.67; 65/97, 174
See application file for complete search history.

(56) References Cited

U.S. PATENT DOCUMENTS

| | | | | |
|---|---|---|---|---|
| 3,543,979 | A | * | 12/1970 | Hamer et al. ...................... 225/2 |
| 5,776,220 | A | | 7/1998 | Allaire et al. |
| 6,023,039 | A | | 2/2000 | Sawada |
| 6,327,875 | B1 | | 12/2001 | Allaire et al. |

(Continued)

FOREIGN PATENT DOCUMENTS

| | | |
|---|---|---|
| JP | 2009066851 A | 4/2009 |
| KR | 20050026253 A | 3/2005 |

(Continued)

OTHER PUBLICATIONS

International Search Report and Written Opinion, dated Feb. 15, 2013, International Application No. PCT/US2012/066786, International Filing Date Nov. 28, 2012.

*Primary Examiner* — Jodi C Franklin
(74) *Attorney, Agent, or Firm* — Harness, Dickey & Pierce, PLC (57) ABSTRACT

Disclosed is a method of separating a glass sheet from a moving glass ribbon, wherein the glass ribbon comprises thickened bead portions. The method comprises weakening the bead portions of the ribbon using laser-initiated ablation at the bead portions to overcome the potential for uncontrolled cracking through the bead portion.

19 Claims, 5 Drawing Sheets

(56) References Cited

U.S. PATENT DOCUMENTS

| | | | |
|---|---|---|---|
| 6,420,678 B1* | 7/2002 | Hoekstra | 219/121.75 |
| 6,559,411 B2 | 5/2003 | Borgeson et al. | |
| 6,919,530 B2 | 7/2005 | Borgeson et al. | |
| 7,014,082 B2 | 3/2006 | Hauer et al. | |
| 7,217,448 B2 | 5/2007 | Koyo et al. | |
| 7,260,959 B2* | 8/2007 | Chang et al. | 65/25.3 |
| 7,528,342 B2 | 5/2009 | Deshi | |
| 7,629,250 B2 | 12/2009 | Benson et al. | |
| 7,642,483 B2 | 1/2010 | You et al. | |
| 7,804,043 B2 | 9/2010 | Deshi | |
| 7,820,941 B2 | 10/2010 | Brown et al. | |
| 7,977,602 B2 | 7/2011 | Birrell | |
| 8,053,704 B2 | 11/2011 | Abramov et al. | |
| 8,171,753 B2 | 5/2012 | Abramov et al. | |
| 8,269,138 B2 | 9/2012 | Garner et al. | |
| 8,430,289 B2* | 4/2013 | John et al. | 225/4 |
| 8,673,745 B2* | 3/2014 | Fukuyo et al. | 438/463 |
| 2002/0006765 A1* | 1/2002 | Michel et al. | 451/28 |
| 2006/0081571 A1 | 4/2006 | Hoebel et al. | |
| 2006/0101858 A1 | 5/2006 | Fujii | |
| 2006/0191970 A1* | 8/2006 | Kataoka et al. | 225/2 |
| 2007/0151962 A1 | 7/2007 | Doll et al. | |
| 2008/0110952 A1 | 5/2008 | Kemmerer et al. | |
| 2008/0264994 A1* | 10/2008 | Herve et al. | 225/2 |
| 2008/0305615 A1* | 12/2008 | Ueno et al. | 438/463 |
| 2009/0126403 A1 | 5/2009 | Abramov et al. | |
| 2009/0134135 A1 | 5/2009 | Lee et al. | |
| 2009/0261082 A1 | 10/2009 | Wagner | |
| 2009/0294419 A1* | 12/2009 | Abramov et al. | 219/121.68 |
| 2010/0015783 A1* | 1/2010 | Fukuyo et al. | 438/463 |
| 2010/0078417 A1 | 4/2010 | Abramov et al. | |
| 2010/0086741 A1* | 4/2010 | Bovatsek et al. | 428/156 |
| 2010/0102042 A1* | 4/2010 | Garner et al. | 219/121.68 |
| 2010/0258993 A1 | 10/2010 | Zhou et al. | |
| 2010/0287991 A1* | 11/2010 | Brown et al. | 65/114 |
| 2010/0294748 A1* | 11/2010 | Garner et al. | 219/121.72 |
| 2011/0000898 A1 | 1/2011 | Rumsby | |
| 2011/0049113 A1* | 3/2011 | Glaesemann et al. | 219/121.72 |
| 2011/0127242 A1* | 6/2011 | Li | 219/121.69 |
| 2011/0127244 A1* | 6/2011 | Li | 219/121.69 |
| 2012/0103018 A1* | 5/2012 | Lu et al. | 65/29.12 |
| 2014/0130649 A1* | 5/2014 | Chang et al. | 83/26 |
| 2014/0182338 A1* | 7/2014 | Abramov et al. | 65/97 |

FOREIGN PATENT DOCUMENTS

| | | |
|---|---|---|
| KR | 686610 B1 | 2/2007 |
| KR | 20110121637 A | 11/2011 |
| WO | WO-03013778 A1 | 2/2003 |
| WO | WO-2008116148 A1 | 9/2008 |
| WO | WO-2009103946 A1 | 8/2009 |
| WO | WO-2009128893 A1 | 10/2009 |
| WO | WO-2011084561 A1 | 7/2011 |

* cited by examiner

METHOD FOR LOW ENERGY SEPARATION OF A GLASS RIBBON

CROSS-REFERENCE TO RELATED APPLICATION

This application is a continuation of U.S. patent application Ser. No. 13/305,158 filed on Nov. 28, 2011. The entire disclosure of the above application is incorporated herein by reference.

FIELD

The present invention relates to a method for low energy separation of a glass ribbon, and in particular a method of separating a glass ribbon wherein the glass ribbon comprises non-parallel major surfaces.

TECHNICAL BACKGROUND

Glass sheets produced with a down draw process, such as a fusion down draw process or a slot draw process, typically begin by producing from a molten glass material a glass ribbon that descends from a forming body. The glass ribbon is subsequently cut or separated into individual glass sheets at a location where the glass of the ribbon has been sufficiently cooled, and a viscosity reached where the ribbon has entered into an elastic state. More simply stated, the portion of the ribbon where the separation takes place is considered to be a solid. However, as the glass ribbon descends from the forming body the ribbon width has a tendency to attenuate and the edge portions of the ribbon thicken. These thickened edge portions are commonly called beads. Separating the glass ribbon across these thickened portions has proven difficult, and results in a large release of energy that can propagate upward toward the region of the glass where the glass transitions from a viscous material into an elastic solid. This energy release can result in the formation of residual stress and possible deformation of the resultant glass sheets.

SUMMARY OF THE INVENTION

Conventional separation of a glass sheet from a ribbon of glass formed from a downdraw process typically includes mechanical scoring of the glass between the thickened beads, followed by a bend break facilitated by robot tooling. The bead portions of the glass ribbon are not scored because of the difficulty generating a consistent vent crack along the separation line due to thickness variation and surface discontinuity. They resist bending with no flaw along the separation line. A larger bend must to be applied for full separation to occur through crack propagation from the scored middle section. The resultant large release of energy at the moment of separation can cause significant motion of the sheet and the ribbon immediately after the break. This motion can be translated into residual stress being imposed in the ribbon if the perturbation reaches the visco-elastic region of the ribbon where the glass forming material comprising the ribbon transitions from a liquid to a solid. In addition, since there is no vent (score) in the bead regions to guide the separation, the trajectory of the crack propagation can change through the bead (e.g. become non-linear). Unfortunately, mechanical scoring of the beads is typically not possible because of the variable glass thickness of the bead portion and the high probability of uncontrollable cracking of the glass.

Accordingly, a method and apparatus are described herein that utilizes a glass ablation effect caused by nanosecond laser pulses.

In one embodiment, a method of separating and removing a glass sheet from a ribbon of glass is disclosed comprising producing a glass ribbon in a down draw process, the glass ribbon comprising a viscous liquid portion and an elastic solid portion, the elastic solid portion of the glass ribbon further comprising a central portion having substantially parallel major surfaces and an edge portion adjacent to the central portion, the edge portion comprising a first major surface and a second major surface coinciding with the first and second major surfaces of the central portion, the first and second major surfaces of the edge portions extending longitudinally along a length of the ribbon, and wherein the first major surface and the second major surface of the edge portion are non-parallel. The first major surface of the edge portion is irradiated with a laser beam from a first laser at a first position, the laser beam being a pulsed laser beam that forms a first laser spot on the first major surface of the edge portion, the pulsed laser beam forming a defect channel through at least a portion of the thickness of the glass ribbon. The laser is traversed in a direction perpendicular to an outer edge of the edge portion. The irradiation of the first major surface of the edge portion is repeated at a second position such that a second laser spot does not overlap with the first laser spot. The glass ribbon is then separated along a line extending through the defect channel to form a glass sheet.

In some embodiments, the separating comprises heating the central portion of the glass ribbon along a first path with a second laser different than the first laser. Damage made by the first laser serves as initiation defect for the second laser.

The method may further comprise cooling the heated second path with a cooling stream (e.g. gas, liquid or a combination thereof) to form a crack extending across at least a portion of the central portion.

The separating may comprise bending the glass ribbon to form a tensile stress across the first major surface that intersects with the crack.

In certain embodiments a wavelength of light from the pulsed laser beam is in a range from about 355 nm to about 532 nm. A repetition rate of the pulsed laser beam may be in a range from about 10 kHz to about 200 kHz. The pulsed laser beam may have a pulse duration equal to or less than about 25 ns. The first laser may be, for example, a Nd:YAG or Nd:YVO4 laser. The second laser may be a $CO_2$ laser. In some embodiments the glass ribbon is continuously moving. For example, the glass ribbon may be formed in a down draw process such as a fusion down draw process.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and constitute a part of this specification. The drawings illustrate various embodiments of the invention and, together with the description, serve to explain the principles and operations of the invention.

DETAILED DESCRIPTION

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

Figure 1:
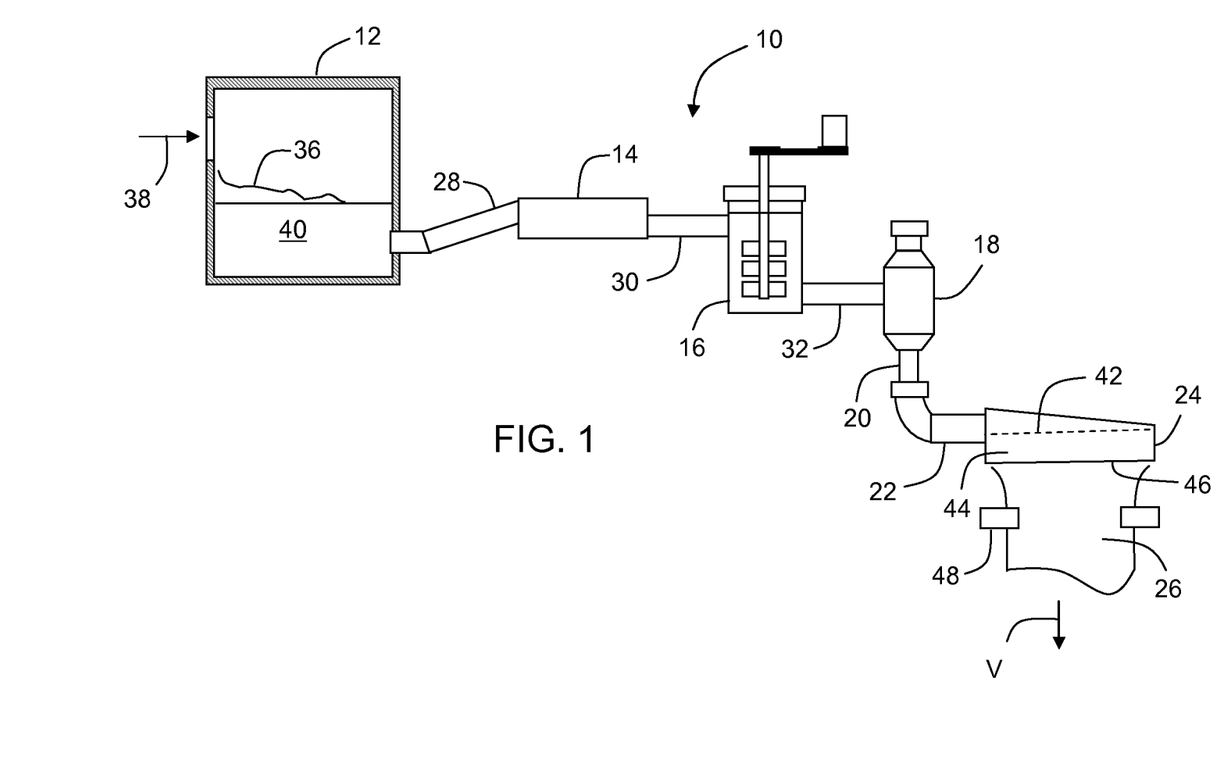
FIG. 1 is a schematic drawing of an exemplary fusion draw system for forming a glass ribbon.

FIG. 1 illustrates an exemplary embodiment of a fusion glass making system 10 for forming a glass sheet comprising melting furnace 12, fining vessel 14, stirring vessel 16, receiving vessel 18, downcomer 20, inlet 22 and forming body 24 from which a thin, continuously moving ribbon 26 of glass descends. Glass making system 10 further comprises various other vessels or conduits for conveying the molten glass-forming material, including a melter-to-fining vessel connecting tube 28, a fining vessel-to-stirring vessel connecting tube 30, and a stirring vessel-to-receiving vessel connecting tube 32. While the melting furnace and forming body are typically formed from a ceramic material, such as ceramic bricks comprising alumina or zirconia in the case of melting furnace 12, the various vessels and piping therebetween often comprise platinum or an alloy thereof. Although the following description relates to an exemplary fusion downdraw process, such as the process illustrated in FIG. 1, the present invention is equally applicable to other variations of downdraw glass making processes such as a single sided overflow process or a slot draw process, which processes are well known to those skilled in the art and will not be described in detail herein.

In accordance with the exemplary fusion process of FIG. 1, melting furnace 12 is provided with a batch material 36, as indicated by arrow 38, that is melted by the furnace to produce a glass-forming material (hereinafter molten glass 40). Molten glass 40 is conveyed from melting furnace 12 to fining vessel 14 through melting furnace-to-fining vessel connecting tube 28. The molten glass is heated in fining vessel 14 to a temperature in excess of the melting furnace temperature, whereupon multivalent oxide materials contained within the molten glass release oxygen that rises through the molten glass. This high-temperature release of oxygen aids in removing small bubbles of gas within the molten glass generated by the melting of the batch material.

Molten glass 40 then flows from fining vessel 14 through fining vessel-to-stirring vessel connecting tube 30 into the stirring vessel 16 where a rotating stirrer mixes and homogenizes the molten glass to ensure an even consistency of the molten glass. The homogenized molten glass from stirring vessel 16 then flows through stirring vessel-to-receiving vessel connecting tube 32 and is collected in receiving vessel 18 and then routed to forming body 24 through downcomer 20 and inlet 22. Forming body 24 forms the molten glass into a glass ribbon.

Figure 2:
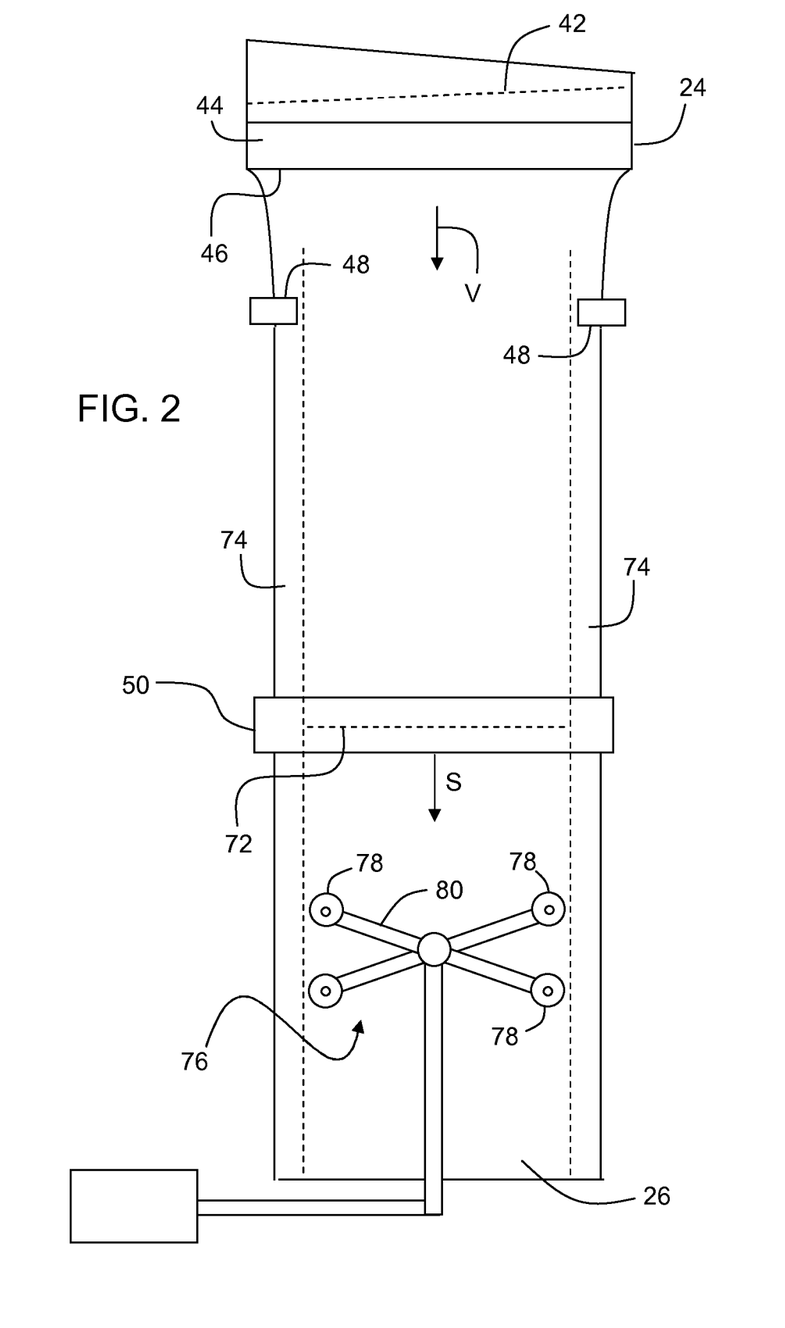
FIG. 2 is a schematic view of an exemplary fusion drawing machine (FDM) that can be used in association with the fusion draw system of FIG. 1.

Forming body 24 comprises an open channel 42 positioned on an upper surface of the forming body and a pair of opposed converging forming surfaces 44, best seen in FIG. 2, that converge at a bottom or root 46 of the forming body. The molten glass supplied to the forming body flows into the open channel 42 and overflows the walls thereof, thereby separating into two individual flows of molten glass that flow over converging forming surfaces 44. When the separate flows of molten glass reach root 46, they recombine, or fuse, to form a single ribbon of glass that descends from the root of the forming body. Pulling rolls 48 contact the viscous glass ribbon along the edges of the ribbon and aid in drawing the ribbon in a downward path with a velocity vector V having both direction and speed. Additional driven and/or non-driven rolls may also contact the edges of the ribbon to aid both in guiding the ribbon and maintaining a width of the ribbon against naturally occurring surface tension effects that work to otherwise reduce the width of the ribbon.

Once the descending ribbon has cooled through the glass transition temperature range and a portion thereof has been transformed from a viscous liquid to an elastic solid, a glass sheet may be produced from the elastic solid portion of the ribbon. The production of the glass sheet from a continuously moving glass ribbon typically involves first scoring the glass ribbon and applying a tensile stress across the score to create a crack, and then driving that crack through the thickness of the ribbon. The score may be formed by any conventional method. For example, the score may be produced by contacting the ribbon with a scoring wheel, a scribe or an abrasive member that creates surface damage to the ribbon. The subsequent tensile stress is applied by bending the glass ribbon in a direction that places the scored side of the glass ribbon, across the score line, in tension. The tension in turns drives the crack formed at the score line through the thickness of the ribbon.

Because the glass ribbon is a continuously moving glass ribbon having a viscous portion, a visco-elastic portion and an elastic portion, care must be taken during the drawing process to prevent perturbations induced into the ribbon, such as during a cutting process, from propagating upward to the visco-elastic region where they may become frozen into the ribbon. As the ribbon moves continuously downward, and the viscous portion transforms from a viscous liquid to an elastic solid, the viscous portion is continuously renewed and the elastic portion continuously removed so that the viscous portion, the visco-elastic portion and the elastic portion describe defined spatial regions on the ribbon that can be delineated in terms of distance from the forming body (typically distance from the root of the forming body when the forming body comprises a fusion process), temperature or viscosity. Movement (e.g. vibration) of the glass ribbon in the visco-elastic region, where the glass transitions from a viscous material into an elastic solid can result in stress being frozen into the glass ribbon. This stress may later manifest as warp in the final glass sheet that is cut from the glass ribbon. That is, the glass sheet may not be flat, but instead exhibit bowing or other deformations that produce out-of-plane excursion of the glass sheet. For example, the glass sheet may exhibit ripples across a width or length of the glass sheet.

Unfortunately, most draw processes for producing a glass sheet from a continuously moving glass ribbon produce thickened edge potions running longitudinally along the length of the glass ribbon. These thickened edge portions, or beads, make it difficult to score the glass ribbon across an entire width of the glass ribbon. Therefore, the score is typically produced across the interior "quality region" of the glass ribbon such that the score terminates a certain finite distance from the extreme outer edges of the ribbon. The quality region of the glass ribbon is that interior portion of the ribbon that is substantially flat, with substantially pristine surfaces. The quality region is that region of the glass ribbon that will eventually be sold to end users and form a portion of a device, such as a display panel found in tablet computers, cell phones, lap-top computers, televisions and other devices comprising display panels.

The distance between the termination points of the score and an edge of the glass ribbon depends on the width of the glass ribbon and the width of the bead portion of the ribbon. To propagate a crack and separate a glass sheet from the glass ribbon a tensile stress is produced across the score by bending the glass ribbon against a nosing or backing device. However, because the bead portions of the glass ribbon are unscored, the crack must not only propagate through the thickness of the glass in the bead region, but must also propagate further width-wise, across the un-scored bead portions of the ribbon. This requires additional energy be input into the ribbon (e.g. by producing more bending than would otherwise be necessary if the bead portions were not present and the score extended across the entire width of the ribbon). When the ribbon breaks, that excess energy can affect the glass ribbon as previously described. In addition, the separation line in the bead areas can deviate from the extension of the score line due to lack of guidance so that crack deviation can occur.

Accordingly, FIG. 2 illustrates forming body 24 and glass ribbon 26 descending therefrom. A traveling anvil machine (TAM) 50 is shown. TAM 50 moves with a velocity vector S that is the same or substantially the same as velocity vector V of the glass ribbon over a range, or stroke, from a top-most position to a bottom-most position. In short, TAM 50 moves downward with the glass ribbon in a reciprocating motion from a home position at the upper-most or top of the TAM stroke, to a lower-most position at the bottom of the TAM stroke. The lower-most position substantially coincides with the point at which a glass sheet is removed from the ribbon, upon the completion of which action the TAM returns to the home position. In a mechanical scoring operation, TAM 50 comprises a backing bar and a scoring device, best seen with the aid of FIG. 3.

Figure 3:
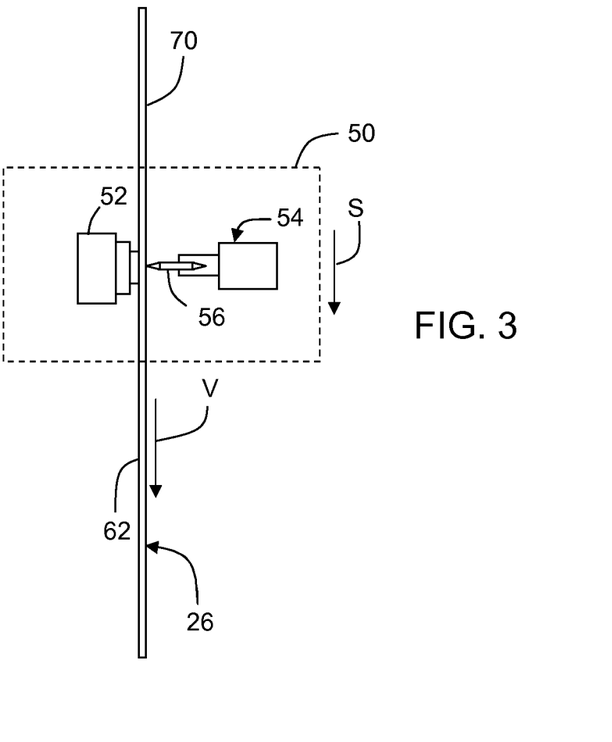
FIG. 3 is a side view of a traveling anvil machine (TAM) comprising a portion of the FDM of FIG. 2.

FIG. 3 is an edge view of glass ribbon 26 depicting TAM 50, backing bar 52 and scoring device 54. Scoring device 54 comprises scoring member 56, such as a score wheel, scribe or abrasive. As TAM 50 descends with glass ribbon 26, backing bar 52 contacts first surface 62 of glass ribbon 26. Scoring device 54 is then extended in a direction toward glass ribbon 26 so that scoring member 56 comes into contact with second surface 70 of glass ribbon 26. Scoring device 54 is then traversed laterally across the glass ribbon (perpendicular to vector V), thereby forming score line 72 across at least a portion of the total width of glass ribbon 26. When the score line has been completed, scoring device 54 and/or scoring member 56 disengages from the glass ribbon and the scoring device and/or scoring member 56 is retracted in a direction away from glass ribbon 26. It should be noted that the score line is preferably formed in the quality region of the glass ribbon. That is, across a width of the ribbon between the bead regions denoted by reference numerals 74 (see FIG. 2).

Robot 76 comprises a plurality of suction cups 78 mounted on a frame 80 and in fluid communication with a vacuum source (not shown). As TAM 50 is descending along vector S, robot 76 engages with glass ribbon 26 by moving frame 80 such that suction cups 78 contact and hold to the glass ribbon. When score 72 is completed, robot 76 moves frame 80 so that a bend is produced in the glass ribbon that induces a tensile stress across score 72. That is, the surface of the glass ribbon that includes the score (second major surface 70) is placed in tension across the score, while the opposing surface (first major surface 62) is placed in compression. The tensile stress in turn drives a crack from score 72 through the thickness of the glass ribbon, thereby completely separating a glass sheet from the ribbon. During the scoring the glass ribbon at the location of the scoring may have a temperature in the range from about 350° C. to about 500° C. This temperature may vary depending on the location at which the temperature is obtained. For example, the temperature within the central quality portion of the ribbon may have a cooler temperature (e.g. 350° C.-400° C.) than the thicker, beaded edges of the ribbon (350° C. to about 500° C.).

Upon separation of the glass sheet, TAM 50 disengages from the glass ribbon (backing bar 52 is retracted in a direction away from the glass ribbon) and moves to the TAM home position in preparation for another cycle.

Figure 4:
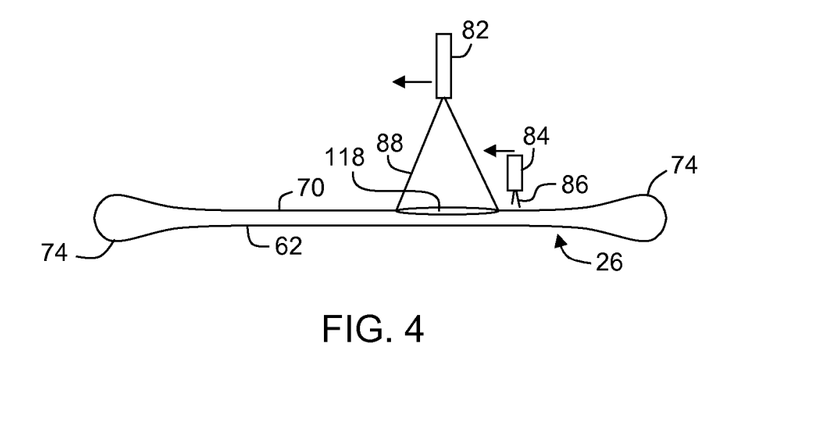
FIG. 4 is a partial cross sectional view of a glass ribbon, as seen from an end thereof, and a laser system for forming a score in the glass ribbon.

In an alternative embodiment, shown in FIG. 4, scoring member 56 of scoring device 54 may be replaced with a laser 82 and optionally a cooling device 84 that contacts glass ribbon 26 with a cooling fluid 86 such as a cooled gas, a liquid, or a combination thereof (a mist). The laser heats the glass ribbon across the intended scoring path with a laser beam 88 that heats a narrow region of the glass ribbon upon which the laser beam impinges. The heated path is then cooled with the cooling fluid, creating a large tension in the glass ribbon that produces a score.

Alternatively, in some embodiments, a full body cut can be induced directly by laser beam 88 without the need for a cooling fluid to contact the glass ribbon. By full body cut what is meant is producing separation in the glass ribbon without the need for producing an initial score line. For example, a sealed tube $CO_2$ laser with a maximum 600 watt power and a fast-axial flow $CO_2$ laser with a maximum 1500 watt power have been used for full body glass separation. The traverse speed of the laser full separation process depends on glass type and thickness, and, in general, the process can be scaled from a traverse speed of 50 mm/sec up to 1000 mm/sec by increasing the length and power of the second laser beam. However, even with a full-body scoring method, separation of the glass sheet from the glass ribbon across the bead portions of the glass ribbon is problematic due to the variation in thickness across the beads portions.

Because there is no score produced in the bead portions of the glass ribbon by the above-described methods, the bending produced by robot 76 must be sufficiently large to induce enough energy into the glass ribbon to cause the crack formed in the quality region to propagate through bead portions 74. When this energy is released at the time the glass sheet separates from the glass ribbon, perturbations are induced that can travel upward in the glass ribbon into the visco-elastic region of the glass ribbon. Accordingly, a method and apparatus for reducing the amount of energy needed to separate a glass sheet from a continuous glass ribbon is disclosed.

Figure 5:
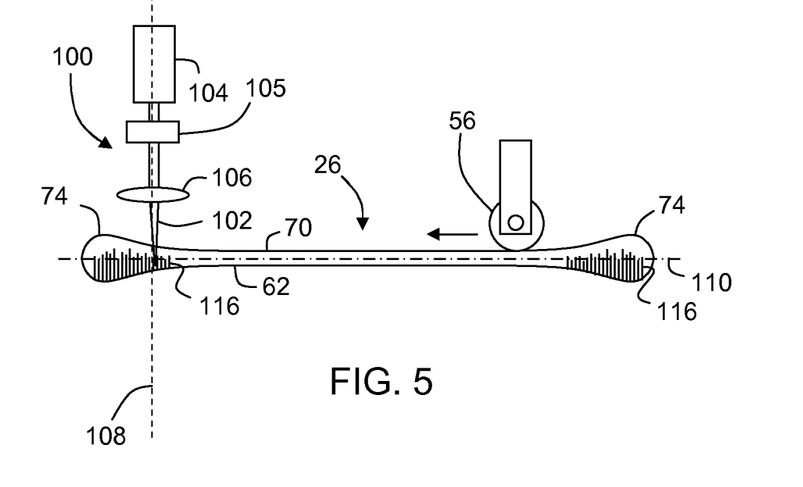
FIG. 5 is a partial cross sectional view of a mechanical scoring system used in combination with a laser system for producing defect channels in the bead portions of a glass ribbon.

Referring now to FIG. 5, a laser system 100 for directing and focusing a laser beam 102 from a laser source 104 onto glass ribbon 26 is shown. Laser system 100 creates a beam with a small spot size in a focal area with a large depth of focus (DOF). The small beam spot size provides sufficient energy density to initiate glass damage through ablation. On the other hand, the large DOF obtains a process more forgiving of variations in glass thickness within the glass beaded area. The laser source should have high beam quality, for example with low $M^2$. Preferably, $M^2$ is equal to or less than 1.2, and more preferably at least 1.05. Laser system 100 may further comprise lens system 106 with a focusing lens that focuses laser beam 102. Preferably, laser system 100 may comprise optional beam expander 105 in front of the focusing lens so the beam spot size can be varied before the focusing lens. As a result, an effective DOF can be controlled and expanded into a range from at least 50 to 1000 microns. Laser source 104 has an output power sufficient to initiate ablation of the glass on surface 62 ("back" surface) and then to propagate the crack within a body of the glass substrate in a form of a small channels comprised of interlocking fractures. For example, an average output power of 14-34 watts, with a peak power of at least 5 kW, has been found to be adequate. Laser source 104 should generally be capable of being operated in a pulsed output mode such that beam 102 generated by laser source 104 comprises discrete laser pulses. Laser system 100 may be incorporated into TAM 50 so that laser system 100 travels along vector S with TAM 50.

Preferably, the laser source 104 is pulsed below the rise time of the laser, to result in a short pulse time (e.g. less than 25 nanoseconds, for example 15-22 nanoseconds measured at full width half maximum: FWHM) having an energy equal to or less than about 18 watts at a wavelength in the range between about 355 nm and 532 nm. As such, the laser source may comprise, for example, a diode-pumped q-switched solid-state Nd:YAG laser or Nd:YVO4 laser. The 532 nm wavelength is preferred, since it allows starting the crack efficiently on the "back" surface of the glass and, most importantly, to propel the crack through the glass thickness in a direction toward laser source 104 over a significant distance of at least 0.5-1.5 mm from the initiation point without moving the focal point of the optical system. A 532 nm wavelength is generally more efficient in terms of interaction with the glass than, for example, a 1064 nm wavelength, and a 532 nm wavelength produces more damage through the thickness of the glass than a beam having a 355 nm wavelength. The pulse repetition rate is preferably in the range from about 10 kHz to about 200 kHz, for example, in the range from 40-100 kHz.

Figure 7:
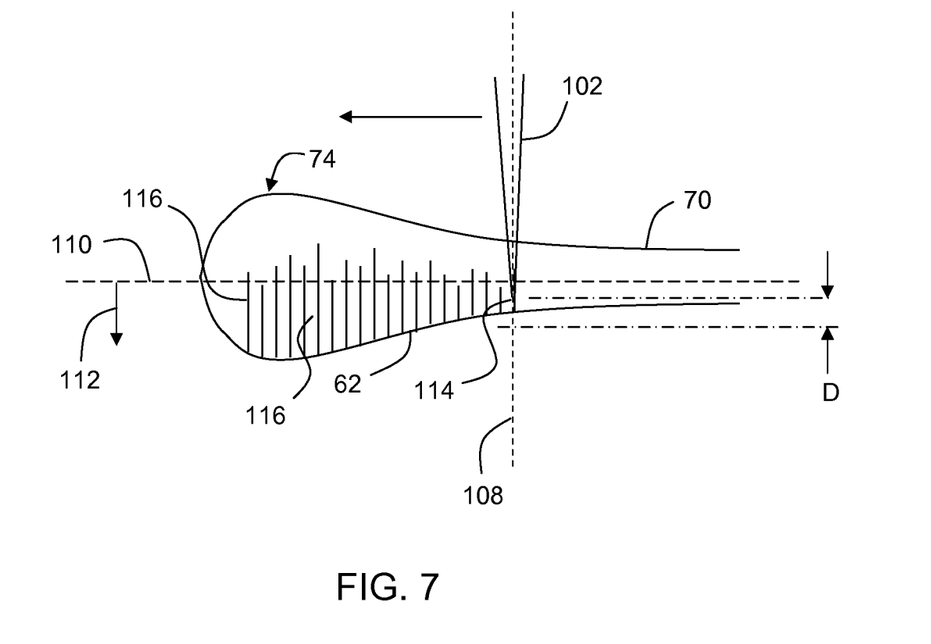
FIG. 7 is a cross sectional view showing a close up of a bead portion of a glass ribbon and defect channels formed by the laser system of FIG. 6.

Laser beam 102 emitted by laser source 104 is directed toward glass ribbon 26 through lens system 106 that focuses the laser beam such that the center of the focal area is located at a distance from surface 62 is equal to about on half of the DOF of the optical system. The focus of the optical components is first established relative to the thinnest section of the bead, and then the beam traverses towards the thicker area of the beads in such a way that the back surface of the glass 62 stays approximately within the depth of the focus of the optical system despite a variation of the bead thickness. Preferably, the defects caused by the laser beam 102 begin at a point on the ribbon where the transition from two opposing, substantially planar surfaces transition into two distinctly non-parallel surfaces (the bead portion of the ribbon). The beam may be focused within an interior of the glass ribbon between first major surface 62 and second major surface 70 if the thickness variation of the bead exceeds the DOF. The beam waist diameter may be in the range from 4 to 18 microns depending on the focusing optics. Preferably, a longitudinal axis 108 of laser beam 102 is substantially perpendicular (within +/−3 degrees) to the general plane of the ribbon, represented by dashed line 110. For example, longitudinal axis 108 of laser beam 102 should be within ±5 degrees of perpendicular to the general plane of the ribbon. Which is to say the laser beam should be substantially perpendicular to a surface of the central quality region of the ribbon, which is parallel to the general plane of the ribbon. Preferably, laser beam 102 is focused at a point not more than one half of the DOF from surface 62 at the thinnest portion of the bead, where the ablation process starts. The beam waist diameter may be in the range from about 4 μm to about 18 μm depending on the focusing optics. That is to say, it is preferable that laser beam 102 be focused at surface 62. However, in some embodiments the laser beam may be focused behind first major surface 62 relative to the direction of the laser beam. For example, laser beam 102 may be focused in "space", outside the glass ribbon but proximate first major surface 62. More generally still, laser beam 102 should be focused such that for any lateral (width-wise) position of the laser beam, the focus point of the laser beam is preferably within +/−DOF/2 from surface 62 (e.g. 25-500 microns; typically 90-200 microns), i.e. within the range D shown in FIG. 7.

Laser beam 102 impinging on surface 70 forms an elongated defect channel 116 within the body of the glass ribbon that extends from a region proximate to, or at, first major surface 62 of glass ribbon 26 in a direction toward second major surface 70. Defect channel 116 comprises a central core area and a series of interconnected cracks. A typical diameter of this "channel" at the initiation point is comparable to the beam waist diameter, but may be larger due to lateral cracks. For example, the full lateral extent of the channel may be >15 microns, while calculated beam waist diameter in this particular case is about 6-9 microns. A first portion of the "channel" after the initial crater appears is of almost constant size. A second portion becomes tapered, and cracking disappears, but the heat affected zone of a larger diameter is still noticeable. In some instances the elongated defect may extend from proximate to, or at, first major surface 62 to as far as second major surface 70. That is, in some instances the elongated defect may extend through the entire thickness of the glass substrate. It should be noted that the channel, as previously disclosed, is a series of interconnected fractures in the glass, distinguishable from the open channel that occurs during a drilling process. During a drilling process, where an open channel is obtained, the beam waist moves through the thickness of the glass, thereby forming an actual channel or tunnel with a constant hole diameter defined and controlled by the beam waist diameter. In accordance with embodiments described herein, the focal point of the laser beam is preferably unchanged during formation of channel 116. Propagation of the channel toward the laser source is supported by the energy within the focal area, which is relatively long and uniform. However, depending on the glass thickness at the point where the laser beam impinges, the position of the focus point may be adjusted relative to surface 62.

Preferably, laser beam 102 is initially incident where the first and second major surfaces 62, 70 of the glass ribbon are parallel with each other, near the thinnest portion of the bead portion. Laser beam 102 is then traversed over the bead portions 74 in a direction toward the outer edge of the glass ribbon so that a plurality of defect channels 116 are produced within bead portions 74. Preferably, the defect channels 116 do not overlap, forming instead a series of discrete (separate)

defect channels over each of the bead portions, the series of defect channels falling on a line extending over at least a portion of the bead portions.

Once a sufficient number of defect channels are produced in each bead portion of the glass ribbon, the scoring process previously described is performed on the glass ribbon. The number of defect channels should be sufficient to weaken the beads without destroying the beads prior to regular scoring. Since air gaps within the bead prevent propagation of the channels through the "top" half of the bead, the integrity of the beads remains. That is, as shown in FIG. 5, scoring device 54, and more specifically scoring member 56, engages with glass ribbon 26 on second major surface 70 at the defect channels 116 to produce score 72 across the quality region of the glass ribbon.

Figure 6:
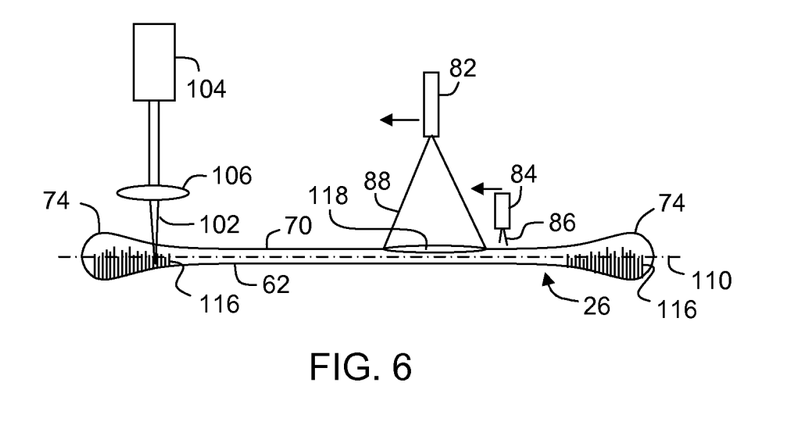
FIG. 6 is a partial cross sectional view of a laser scoring system used in combination with a laser system for producing defect channels in the bead portions of a glass ribbon.

Alternatively, as shown in FIG. 6, laser source 82 produces laser beam 88 that impinges on second major surface 70 of glass ribbon 26. Second laser source 82 may be, for example, a $CO_2$ laser. Preferably, laser beam 88 begins outside an edge of the glass ribbon and traverses first over a bead portion, impinging on the defect channels, and traveling in a direction toward the opposite edge of the glass ribbon, traversing over second surface 70 of glass ribbon 26 (i.e. within the quality area of the glass ribbon), thereby heating the glass ribbon along a score line. Preferably, the beam spot 118 formed on second surface 70 by laser beam 88 is an elongated beam spot. A cooling jet may be used to cool the glass ribbon along score 72 as the score is formed by laser beam 88

Regardless whether a mechanical scoring device or a laser is used to produce a score in the quality region of the glass ribbon, preferably the score follows a line forming the path of the plurality of defect channels formed in the bead portion(s) 74.

When defect channels 116 produced by laser beam 102 are completed, and after the scoring operation performed by laser beam 88 is completed (or scoring member 56), a tensile stress is produced across the score produced by laser beam 88 by bending the glass ribbon, e.g. via robot 76. The bending-induced tensile stress extends the flaw formed by the scoring, thereby extending a crack both through the thickness of the glass ribbon and across a width of the glass ribbon such that the crack intersects the defect channels formed by laser beam 102. The defect channels produced in the bead region weaken the bead portions and reduce the amount of energy necessary to completely separate a glass sheet from the glass ribbon.

It should be noted that the method used to produce defect channels in the bead portions of the glass ribbon is not restricted to glass having non-parallel major surfaces, but may also be used on glass having parallel major surfaces, such as individual glass sheets, or glass ribbon that do not comprise bead portions. Moreover, as noted above, the method described herein is not limited to processes comprising a continuously moving glass ribbon, but may be used in processes where the glass ribbon, or glass sheet, does not move.

It is preferable to create flaws either on one bead or on both beads with different magnitude such that crack initiation will be consistent from one end and propagate across the entire sheet width to avoid separation-induced cracking (cracking that does not follow the score) and achieve good edge quality. For example, in one scenario a flaw is created at one bead portion, as the glass ribbon is bent to separate a glass sheet, a crack initiates at the bead portion and then propagates through the score line and the other bead. In a second scenario, flaws are created at both beads portions, the flaw having similar magnitude (e.g. crack depth). As the glass ribbon is bent, the cracks initiate from both bead portions and propagate toward the center of the ribbon. Finally, in a third scenario, flaws are created at both bead portions, but with significantly different magnitudes. When the ribbon is bent, a crack initiates from the bead portion having the flaw with the greatest magnitude and then propagates along the score line to the opposite bead portion. The smaller magnitude flaw still reduces the energy to separate the glass ribbon at the opposite bead portion. Each of these scenarios is an acceptable method of separating a glass sheet from the glass ribbon.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method of separating a glass sheet from a ribbon of glass comprising:
    drawing a glass ribbon from a forming body, the glass ribbon comprising a central portion and first and second edge portions;
    irradiating a first surface of the edge portion with a pulsed laser beam from a first laser at a first position on the first surface, the pulsed laser beam comprising a depth of focus, and a focus point of the pulsed laser beam is positioned outside the glass ribbon a distance from a second surface of the first edge portion opposite the first surface within the laser beam forming a defect channel through at least a portion of a thickness of the glass ribbon at the first position;
    traversing the laser in a direction parallel to a surface of the central portion and repeating the irradiating with the first laser to form a plurality of discrete defect channels in the second edge portion along a line perpendicular to the outer edge;
    scoring the central portion of the glass ribbon, wherein a score line formed by the scoring aligns with the line of defect channels; and
    separating the glass ribbon along the score line.

2. The method according to claim 1, wherein the glass ribbon is moving during the irradiating.

3. The method according to claim 1, wherein the laser beam is substantially perpendicular to a surface of the central portion.

4. The method according to claim 1, wherein the focus point is positioned within an interior of the edge portion.

5. The method according to claim 1, wherein the focus point position is in a range from 90 micrometers to 200 micrometers from the second surface.

6. The method according to claim 1, wherein the traversing is in a direction toward an outer edge of the edge portion.

7. The method according to claim 1, wherein the separating comprises bending the glass ribbon to form a tensile stress across the score line.

8. The method according to claim 1, wherein the scoring comprises contacting the central portion with a scoring member.

9. The method according to claim 1, wherein the first and second surfaces of the edge portion are non-parallel.

10. A method of separating a glass sheet from a ribbon of glass comprising:
    providing a glass ribbon comprising a central portion and first and second edge portions;
    irradiating a first surface of the edge portion with a pulsed laser beam from a laser at a first position on the first surface, the pulsed laser beam comprising a depth of focus, and a focus point of the pulsed laser beam is positioned outside the glass ribbon a distance from a second surface of the first edge portion opposite the first the laser beam forming a defect channel through at least a portion of a thickness of the glass ribbon at the first position;

traversing the laser in a direction parallel to a surface of the central portion and repeating the irradiating with the laser to form a plurality of discrete defect channels in the second edge portion along a line parallel to the surface of the central portion;

scoring the central portion of the glass ribbon, wherein a score line formed by the scoring aligns with a line defined between at least two of the defect channels; and separating the glass ribbon along the score line.

11. The method according to claim 10, wherein the glass ribbon is moving during the irradiating.

12. The method according to claim 10, wherein the laser beam is substantially perpendicular to a surface of the central portion.

13. The method according to claim 10, wherein the focus point is positioned within an interior of the edge portion.

14. The method according to claim 11, wherein the focus point position is in a range from 90 micrometers to 200 micrometers from the second surface.

15. The method according to claim 10, wherein the traversing is in a direction toward an outer edge of the edge portion.

16. The method according to claim 10, wherein the separating comprises bending the glass ribbon to form a tensile stress across the score line.

17. The method according to claim 10, wherein the first and second surfaces of the edge portion are non-parallel.

18. The method according to claim 10, wherein the focus point is within one half the depth of focus.

19. The method according to claim 1, wherein the focus point is within one half the depth of focus.

* * * * *